US010437643B2

(12) United States Patent
Zott et al.

(10) Patent No.: US 10,437,643 B2
(45) Date of Patent: Oct. 8, 2019

(54) INDEPENDENT STORAGE AND PROCESSING OF DATA WITH CENTRALIZED EVENT CONTROL

(71) Applicant: Bank of America Corporation, Charlotte, NC (US)

(72) Inventors: Jerome M. Zott, Glastonbury, CT (US); Faisal Azfar, Austin, TX (US); Vijaya M. Anusuri, Charlotte, NC (US); Sridhar Ramaswamy, Charlotte, NC (US); Robert J. Nicholson, Charlotte, NC (US); Sitaram C. Yarlagadda, Belmont, NC (US)

(73) Assignee: Bank of America Corporation, Charlotte, NC (US)

( * ) Notice: Subject to any disclaimer, the term of this patent is extended or adjusted under 35 U.S.C. 154(b) by 146 days.

(21) Appl. No.: 15/809,683

(22) Filed: Nov. 10, 2017

(65) Prior Publication Data

US 2019/0146838 A1 May 16, 2019

(51) Int. Cl.
*G06F 3/06* (2006.01)
*H04L 29/06* (2006.01)
*G06F 9/50* (2006.01)

(52) U.S. Cl.
CPC .............. *G06F 9/50* (2013.01); *G06F 3/0604* (2013.01); *G06F 3/067* (2013.01); *G06F 3/0631* (2013.01); *H04L 63/0807* (2013.01)

(58) Field of Classification Search
None
See application file for complete search history.

(56) References Cited

U.S. PATENT DOCUMENTS

| 6,928,646 | B1* | 8/2005 | James | G06F 9/4881 718/100 |
|---|---|---|---|---|
| 7,681,242 | B2* | 3/2010 | Green | G06F 9/50 726/27 |
| 8,434,088 | B2* | 4/2013 | Banerjee | G06F 9/5011 718/100 |
| 8,645,399 | B2 | 2/2014 | McNeill et al. | |
| 8,873,836 | B1* | 10/2014 | Dietrich | G06K 9/00973 382/155 |
| 8,949,175 | B2 | 2/2015 | Wu et al. | |
| 9,031,925 | B2 | 5/2015 | Gardella et al. | |
| 9,092,451 | B1 | 7/2015 | Djam et al. | |
| 9,130,920 | B2 | 9/2015 | Pelykh | |
| 9,172,608 | B2 | 10/2015 | Zeyliger et al. | |

(Continued)

*Primary Examiner* — Isaac T Tecklu
(74) *Attorney, Agent, or Firm* — Banner & Witcoff, Ltd.; Michael A. Springs (57) ABSTRACT

Aspects of the disclosure relate to enabling independent storage and processing of data with centralized event control. An event control computing platform may receive an indicator of a processing task associated with processing a dataset. Subsequently, the event control computing platform may authenticate the indicator of the processing task. Then the event control computing platform may identify and allocate resources for executing the processing task and storing the dataset. Finally, the event control computing platform may generate and transmit a series of commands to cause the dataset to be accessed by the processing platform, cause the processing task associated with the dataset to be executed, and cause the processed dataset to be stored on the storage platform.

18 Claims, 8 Drawing Sheets

(56) References Cited

U.S. PATENT DOCUMENTS

| | | |
|---|---|---|
| 9,178,935 B2 | 11/2015 | Chiu et al. |
| 9,183,016 B2 | 11/2015 | Zhou et al. |
| 9,223,845 B2 | 12/2015 | Horn |
| 9,280,381 B1 | 3/2016 | Florissi et al. |
| 9,304,803 B2 | 4/2016 | Nelson et al. |
| 9,305,010 B1 | 4/2016 | Faibish et al. |
| 9,342,557 B2 | 5/2016 | Kornacker et al. |
| 9,424,274 B2 * | 8/2016 | Cramer ................. G06F 9/5061 |
| 9,454,493 B1 * | 9/2016 | Adogla ............... G06F 21/6209 |
| 9,477,731 B2 * | 10/2016 | Kornacker ............ G06F 16/258 |
| 9,483,493 B2 | 11/2016 | Wu |
| 9,501,550 B2 | 11/2016 | Zhang et al. |
| 9,582,221 B2 * | 2/2017 | Du .......................... G06F 3/065 |
| 9,607,073 B2 | 3/2017 | Schechter et al. |
| 9,626,411 B1 | 4/2017 | Chang et al. |
| 9,633,052 B2 | 4/2017 | Seetharaman et al. |
| 9,727,355 B2 | 8/2017 | Holler et al. |
| 9,729,612 B2 | 8/2017 | Chiu et al. |
| 9,740,706 B2 | 8/2017 | Cramer et al. |
| 9,773,003 B2 | 9/2017 | Gopalakrishnan et al. |
| 9,792,327 B2 | 10/2017 | Chang et al. |
| 9,804,887 B2 * | 10/2017 | Rangaraju ............. G06F 9/4843 |
| 9,811,533 B2 * | 11/2017 | Baptist .................. G06F 16/182 |
| 9,813,501 B2 * | 11/2017 | Alnafoosi ............... H04L 67/10 |
| 2002/0112178 A1 * | 8/2002 | Scherr ................. G06F 12/1466 |
| | | 726/4 |
| 2017/0168729 A1 * | 6/2017 | Faulkner ............... G06F 3/0613 |

\* cited by examiner

INDEPENDENT STORAGE AND PROCESSING OF DATA WITH CENTRALIZED EVENT CONTROL

BACKGROUND

Aspects of the disclosure relate to electrical computers, digital processing systems, and multicomputer data processing. In particular, one or more aspects of the disclosure relate to enabling independent storage and processing of data with centralized event control to increase the efficiency by which the data is processed.

As computer systems are increasingly utilized to store and process large volumes of data, such computer systems may obtain and maintain increasing amounts of various types of sensitive information, and ensuring the safety, security, and accuracy of this information may be increasingly important. In many instances, however, it may be difficult to ensure the safety and security of such information while also optimizing the efficient and effective technical operations of the computer systems that process such information.

SUMMARY

Aspects of the disclosure provide effective, efficient, scalable, and convenient technical solutions that address and overcome the technical problems associated with providing information security and optimizing the efficient and effective technical operations of computer systems. In particular, one or more aspects of the disclosure provide techniques for processing datasets using multicomputer data processing technology and centralized event control to improve information security, enhance technical performance, and accommodate independent scaling up or scaling down of storage and computing capabilities.

In accordance with one or more embodiments, an event control computing platform having at least one processor, a memory, and a communication interface may receive, via a communication interface, an indicator of a processing task associated with processing a dataset. The event control computing platform may authenticate the indicator of the processing task associated with the dataset. The event control computing platform may identify a first level of resources required for executing the processing task. The event control computing platform may allocate the first level of resources required for executing the processing task on a processing platform. The event control computing platform may identify a second level of resources required for storing the dataset and allocate the second level of resources required for storing the dataset on a storage platform independent of the first level of resources allocated for executing the processing task. The event control computing platform may authorize execution of the processing task by the processing platform. The event control computing platform may generate a first command configured to cause the dataset to be accessed by the processing platform from the storage platform and transmit, via the communication interface, the first command to the processing platform. The event control computing platform may generate a second command configured to cause the processing task associated with the dataset to be executed and may transmit, via the communication interface, the second command to the processing platform. The event control computing platform may generate a third command configured to cause the processed dataset to be stored on the storage platform and transmit, via the communication interface, the third command to the storage platform.

In some embodiments, the event control computing platform may generate a fourth command to cause the processed dataset to be analyzed by a data analysis platform and transmit, via the communication interface, the fourth command to the data analysis platform.

In some aspects, the processing platform may include a plurality of data processing clusters. In additional aspects, the storage platform may include encrypted storage zones. In other aspects, the event control computing platform may identify a modified level of resources required for executing the processing task and allocate the modified level of resources required for executing the processing task on the processing platform. In additional aspects, the event control computing platform may identify a modified level of resources required for storing the dataset and allocate the modified level of resources required for storing the dataset.

In other aspects, the storage platform may comprise a distributed file system. Moreover, the processing platform may be configured to perform Monte Carlo simulations on the dataset. Finally, the storage platform and the processing platform may use a same security layer.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Aspects of the disclosure relate to independent storage and processing of data with centralized event control. In some embodiments, the processing capabilities of a data processing platform and the storage capacity of a storage platform can be independently scaled on demand based on the needs of a particular dataset and processing task.

Aspects of the disclosure further relate to a data processing and storage system that does not require an up-front set of dedicated physical servers. In some embodiments, data may not be stored locally and may be processed to meet many use cases within an organization. Furthermore, computational and storage functionalities of the system described herein may not be tightly-coupled, thus resulting in a system with reduced time to market and lower costs. Further still, aspects of the disclosure relate to a data processing and storage system with on-demand clusters of computing and storage resources for rapid deployment and multi-tenancy (i.e., for compatibility with multiple data processing applications). Moreover, this system may be compatible with a private, public, or hybrid cloud architecture.

Figure 1A:
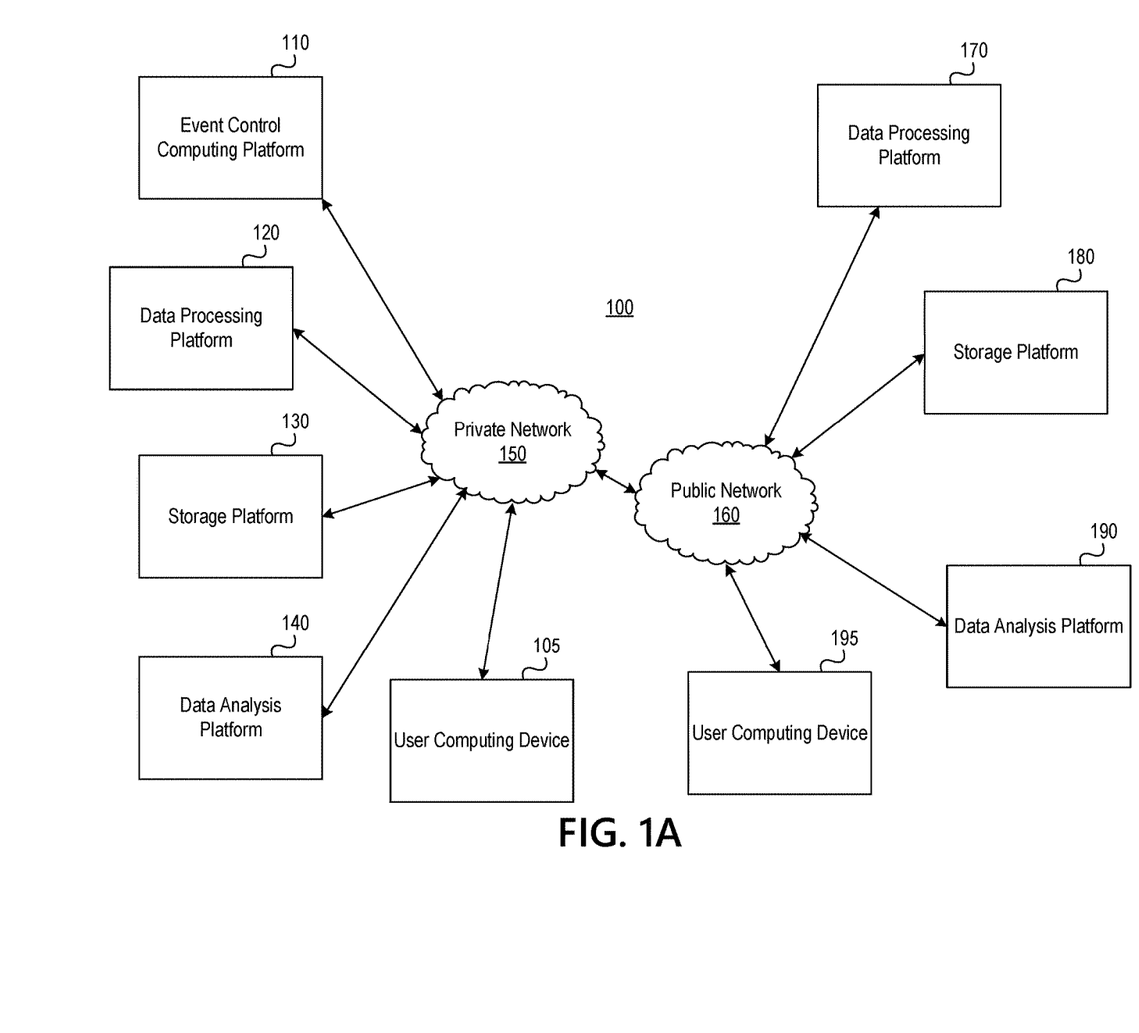
FIGS. 1A and 1B depict an illustrative computing environment for controlling events related to data storage and processing executed across multiple computing platforms and devices in accordance with one or more example embodiments.
Figure 1B:
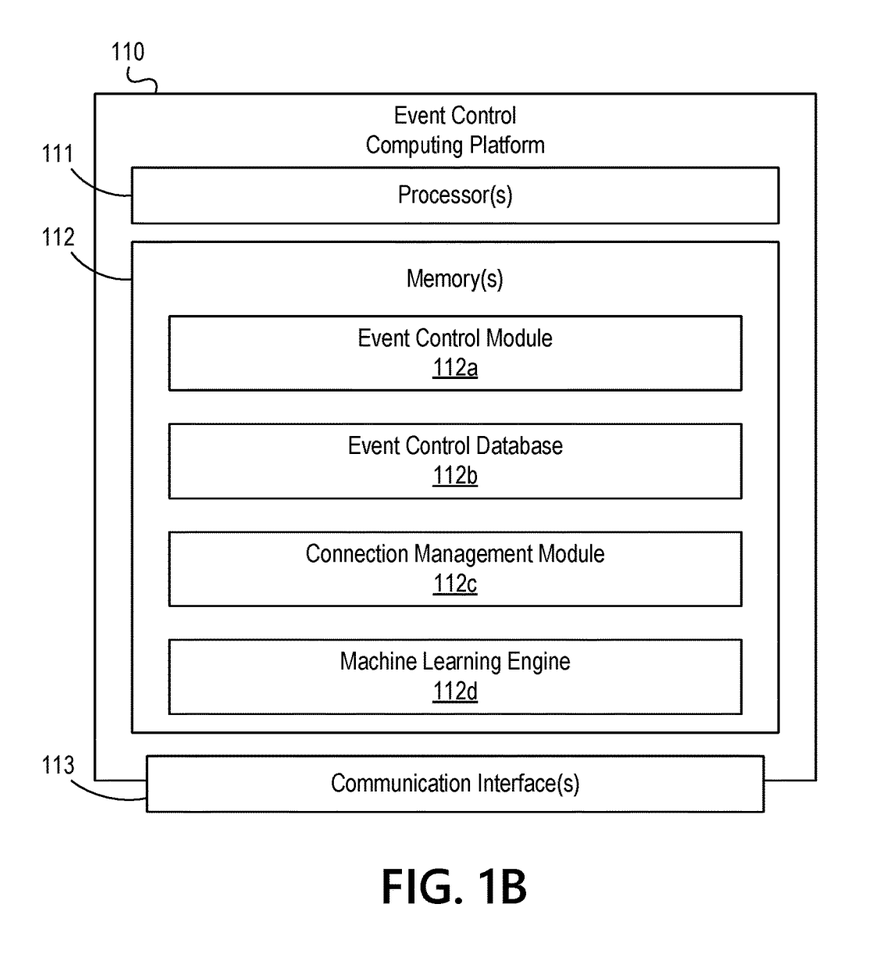

FIGS. 1A and 1B depict an illustrative computing environment for controlling events related to data storage and processing executed across multiple computing platforms and devices in accordance with one or more example embodiments. Referring to FIG. 1A, computing environment 100 may include one or more computer systems, one or more computer networks, and/or other computing infrastructure. For example, computing environment 100 may include a user computing device 105, event control computing platform 110, data processing platform 120, storage platform 130, data analysis platform 140, a private network 150, a public network 160, data processing platform 170, storage platform 180, data analysis platform 190, and user computing device 195.

As discussed in greater detail below, event control computing platform 110 may include one or more computing devices configured to perform one or more of the functions described herein. For example, event control computing platform 110 may include one or more computers (e.g., laptop computers, desktop computers, servers, server blades, or the like) that are configured to orchestrate event control operations (e.g., data processing and storage events) across multiple computer systems and devices in computing environment 100. In one example, platform 110 may receive an indicator to begin a data processing task from user computing devices 105, 195.

Data processing platforms 120, 170 may include one or more computing devices configured to process data retrieved from storage platforms 130, 180 and/or other sources. Platforms 120, 170 may be configured to run numerous types of applications to process a dataset. In some aspects, platforms 120, 170 may include many central processing unit (CPU) cores and/or many graphics processing units (GPUs). In one example, data processing platforms 120, 170 may include over 200,000 CPU cores and over 2,500 GPU cores and may process data at speeds of over 8 petaflops. Data processing platforms 120, 170 may efficiently handle computationally intensive workloads (e.g., by operating a petaflop speeds). In some examples, the types of processing tasks handled by platforms 120, 170 may include Monte Carlo simulations of large quantities of data or other types of computationally intensive tasks. In some aspects, data processing platforms 120, 170 may not include any data storage capabilities.

Data processing platforms 120, 170 may obtain one or more datasets from storage platforms 130, 180. Storage platforms 130, 180 may include many clusters or nodes of storage devices for storing large amounts of data and may comprise a multi-tenant platform supporting a multitude of use cases within an organization managing storage platforms 130, 180. In one example, storage platforms 130, 180 may include a distributed file system. In another example, storage platforms 130, 180 may include over 250 nodes with over 5 petabytes of storage space and may serve as a data lake governed by a security framework. Moreover, storage platforms 130, 180 may include encrypted storage zones that require decryption prior to processing. The security framework or layer associated with storage platforms 130, 180 may be the same as or different from the security framework or layer associated with data processing platforms 120, 170. Moreover, storage platforms 130, 180 may include significant data processing capabilities on their own but may not include as much processing power as data processing platforms 120, 170. Moreover, storage platforms 130, 180 may be beneficial for batch processing of data, real time data streaming, data analytics and reporting, and data archival. In general, a data processing task may be submitted using a task submission portal (e.g., event control computing platform 110) to data processing platforms 120, 170 or storage platforms 130, 180, and data processing platforms 120, 170 and storage platforms 130, 180 may either share a task submission portal or may have independent task submission portals. Moreover, event control computing platform 110, data processing platforms 120, 170, and storage platforms 130, 180 may support batch and interactive task execution.

Data processing platforms 120, 170 and storage platforms 130, 180 may be scaled up or down on demand based on the needs of a particular processing task acting on a given dataset. Moreover, data processing platforms 120, 170 and storage platforms 130, 180 may be scaled independently so that a processing task that requires extensive processor capabilities can be paired with a dataset that requires limited storage space and vice versa. Finally, data processing platforms 120, 170 and storage platforms 130, 180 may be located in the same location or may be located in separate, remote locations (e.g., accessible via the network). In one example, data processing platforms 120, 170 and storage platforms 130, 180 may not be bundled together to facilitate scaling of data processing platforms 120, 170 independent of the scaling of storage platforms 130, 180. Thus, event control computing platform 110, data processing platforms 120, 170 and storage platforms 130, 180 may result in a scalable modeling platform to meet the needs of an organization to execute computationally intensive models independent of data intensive workloads.

In one example, the system shown in FIG. 1A may establish a hybrid cloud architecture for large-scale data processing and storage. This hybrid cloud architecture may result in data processing throughput that is three times higher than use of the more limited data processing capabilities of storage platforms 130, 180 alone. Moreover, separation of storage platforms 130, 180 from data processing platforms 120, 170 may not result in a significant degradation in performance (e.g., due to the fact that platforms 120, 170 must now potentially communicate with platforms 130, 180 over larger distances). In fact, the extensive computational resource availability of data processing platforms 120, 170 may help in executing more models in parallel. In one example, reading a processed dataset that is 1 terabyte in size on data processing platforms 120, 170 and storing that dataset onto storage platforms 130, 180 may take 2-5 minutes. In this example, reading a processed dataset that is 5 terabytes in size on data processing platforms 120, 170 and storing that dataset onto storage platforms 130, 180 may take 12 minutes.

Event control computing platform 110, data processing platforms 120, 170 and storage platforms 130, 180 may be operated by the same organization or by different organizations. In one example, event control computing platform 110, data processing platforms 120, 170, and storage platforms 130, 180 may be operated by a financial institution such as a bank seeking to run simulations of different economic conditions to determine, for example, how much capital the financial institution may invest in lieu of setting the capital aside to satisfy regulatory requirements or meet expenses. In this example, data processing platforms 120, 170 may simulate various financial portfolios of the financial institution (e.g., loan portfolios, credit card portfolios) under different economic scenarios using various mathematical models (e.g., Monte Carlo simulations). Platforms 120, 170 may be employed to execute models that simulate internal and regulatory stress scenarios. Simulation of these scenarios may require the extensive computational capabilities of data processing platforms 120, 170 and the extensive storage capabilities of storage platforms 130, 180. Thus, in this example, event control computing platform 110, data processing platforms 120, 170 and storage platforms 130, 180 may result in a scalable modeling platform to run computationally intensive models that can ramp up and ramp down the dedicated assets for attaining a predetermined computational power and storage capacity based on the computational demand.

Data analysis platforms 140, 190 may allow the data stored in storage platforms 130, 180 to be queried, summarized, and analyzed using various types of software applications. Platforms 140, 190 may be operated by the same organization that operates at least one of event control computing platform 110, data processing platforms 120, 170, and storage platforms 130, 180. Alternatively, platforms 140, 190 may be operated by an organization different from the organization that operates at least one of event control computing platform 110, data processing platforms 120, 170, and storage platforms 130, 180.

Computing environment 100 also may include one or more networks, which may interconnect one or more of event control computing platform 110, data processing platforms 120, 170, storage platforms 130, 180, and data analysis platforms 140, 190. For example, computing environment 100 may include private network 150, which may be owned and/or operated by a specific organization and/or which may interconnect one or more systems and/or other devices associated with the specific organization. For example, event control computing platform 110, data processing platform 120, storage platform 130, and data analysis platform 140 may be owned and/or operated by a specific organization, such as a financial institution, and private network 150 may interconnect event control computing platform 110, data processing platform 120, storage platform 130, data analysis platform 140, and one or more other systems and/or devices associated with the organization. Additionally, private network 150 may connect (e.g., via one or more firewalls) to one or more external networks not associated with the organization, such as public network 160. Public network 160 may, for instance, include the internet and may connect various systems and/or devices not associated with the organization operating private network 140. For example, public network 160 may interconnect data processing platform 170, storage platform 180, data analysis platform 190, and/or various other systems and/or devices.

In one example, event control computing platform 110 may control events related only to data processing platform 120, storage platform 130, and/or data analysis platform 140 (i.e., events related to data processing, storage, and analysis on private network 150). In other examples, event control computing platform 110 may control events related only to data processing platform 170, storage platform 180, and/or data analysis platform 190 (i.e., events related to data processing, storage, and analysis on public network 160). In yet other examples, event control computing platform 110 may control events related to data processing platforms 120, 170 storage platforms 130, 180 and/or data analysis platforms 140, 190 (i.e., events related to data processing, storage, and analysis on both private network 150 and public network 160).

In some arrangements, the computing devices that make up and/or are included in event control computing platform 110, data processing platforms 120, 170, storage platforms 130, 180, and data analysis platforms 140, 190 may be any type of computing device capable of communicating with one or more other computing devices. For example, the computing devices that make up and/or are included in event control computing platform 110, data processing platforms 120, 170, storage platforms 130, 180, and data analysis platforms 140, 190 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of the computing devices that make up and/or are included in event control computing platform 110, data processing platforms 120, 170, storage platforms 130, 180, and data analysis platforms 140, 190 may, in some instances, be special-purpose computing devices configured to perform specific functions.

Referring to FIG. 1B, event control computing platform 110 may include one or more processor(s) 111, memory(s) 112, and communication interface(s) 113. A data bus may interconnect processor(s) 111, memory(s) 112, and communication interface(s) 113. Communication interface(s) 113 may be one or more network interfaces configured to support communications between event control computing platform 110 and one or more networks (e.g., private network 150, public network 160). For example, event control computing platform 110 may establish one or more connections and/or communication links to one or more other systems and/or devices (e.g., data processing platforms 120, 170, storage platforms 130, 180, and data analysis platforms 140, 190) via communication interface(s) 113, and event control computing platform 110 may exchange data with the one or more other systems and/or devices (e.g., data processing platforms 120, 170, storage platforms 130, 180, and data analysis platforms 140, 190) via communication interface(s) 113 while the one or more connections and/or communication links are established. Memory(s) 112 may include one or more program modules having instructions that when executed by processor(s) 111 cause event control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of event control computing platform 110 and/or by different computing devices that may form and/or otherwise make up event control computing platform 110.

For example, memory(s) 112b may have, store, and/or include an event control module 112a, an event control database 112b, a connection management module 112c, and a machine learning engine 112d. Event control module 112a may have, store, and/or include instructions that direct and/or cause event control computing platform 110 to orchestrate event control operations across multiple computer systems and devices in computing environment 100 and perform other associated functions, as discussed in greater detail below. Event control database 112b may store information used by event control computing platform 110 in orchestrating event control operations across multiple computer systems and devices in computing environment 100 and in performing other associated functions. Connection management module 112c may have, store, and/or include instructions that direct and/or cause event control computing platform 110 to establish one or more connections and/or communication links to one or more other systems and/or devices (e.g., data processing platforms 120, 170, storage platforms 130, 180, and data analysis platforms 140, 190) via communication interface(s) 113 and/or to manage and/or otherwise control the exchanging of data with the one or more other systems and/or devices (e.g., data processing platforms 120, 170, storage platforms 130, 180, and data analysis platforms 140, 190) via communication interface(s) 113 while the one or more connections and/or communication links are established. Machine learning engine 112d may have, store, and/or include instructions that direct and/or cause event control computing platform 110 to dynamically analyze data collected by event control computing platform 110 based on historical data sets and/or present operations and automatically optimize the functions provided by event control computing platform 110 based on analyzing such data.

FIGS. 2A-2E depict an illustrative event sequence for independent storage and processing of data with centralized event control in accordance with one or more example embodiments. Note that even though this event sequence employs only event control computing platform 110, data processing platform 120, storage platform 130, and data analysis platform 140, the sequence is fully compatible with use of additional or alternative devices, such as data processing platform 170, storage platform 180, and data analysis platform 190.

Figure 2A:
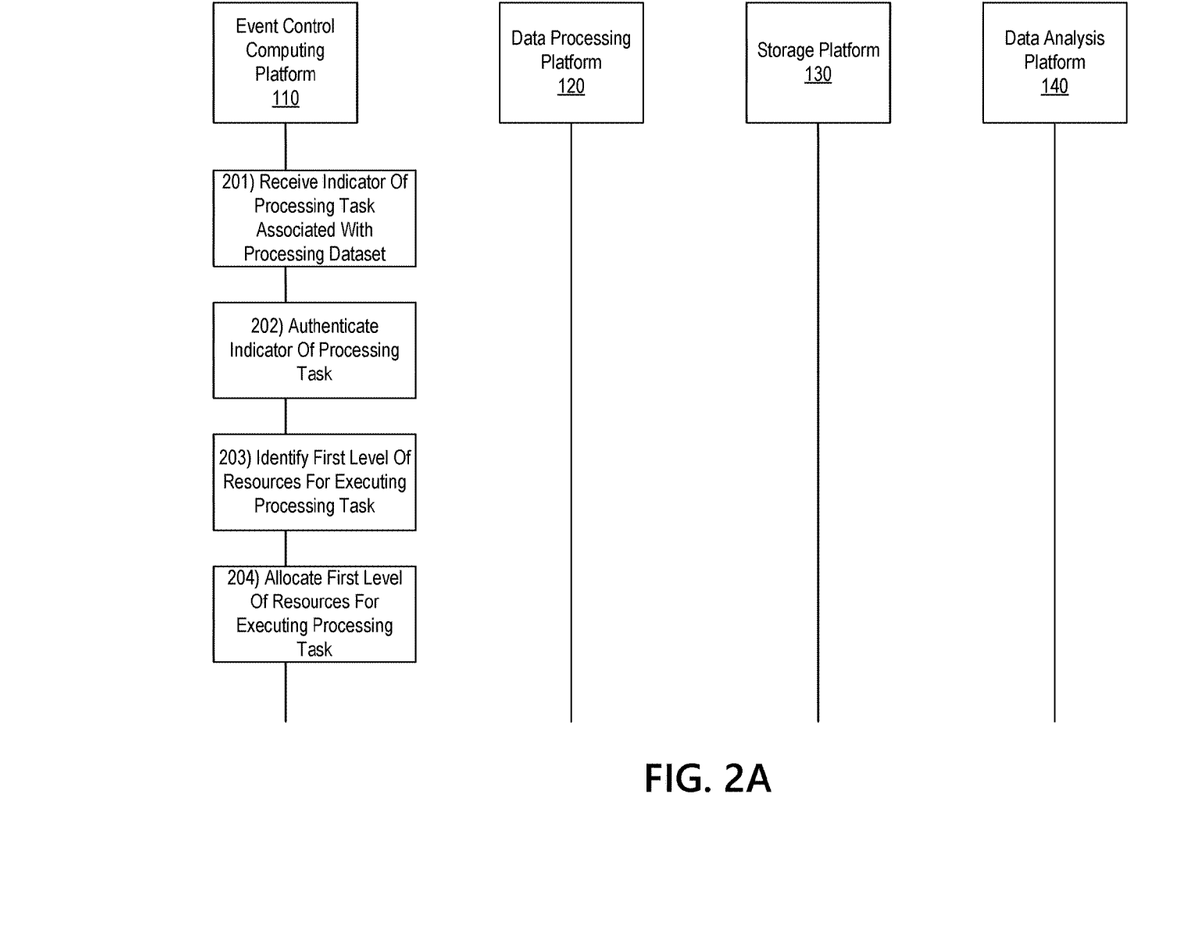
FIGS. 2A-2E depict an illustrative event sequence for independent storage and processing of data with centralized event control in accordance with one or more example embodiments.

Referring to FIG. 2A, at step 201, event control computing platform 110 may receive an indicator of a processing task associated with processing a dataset. In general, event control computing platform 110 may receive the indicator of the processing task from another computing device, including, for instance, a user computing device (e.g., user computing device 105, 195). The indicator may represent a task or service identifier and may include alphanumeric characters, images, or some other data to uniquely identify the processing task. In one example, event control computing platform 110 may be operated by a financial institution such as a bank. Also, in one example, the processing task may involve complex simulations (e.g., Monte Carlo simulations) on a large dataset and may require high computational resources (e.g., clusters of computing cores processing data stored on many storage devices).

Event control computing platform 110 may then authenticate the indicator of the processing task in step 202. Platform 110 may authenticate the indicator through a key distribution center that compares the submitted indicator against those stored in an active directory of the key distribution center. If the indicator is authenticated, platform 110 may generate a ticket that serves as an authentication token for data processing platform 120 and storage platform 130. If, however, the received indicator is not authenticated, platform 110 may request another indicator from the computing device that submitted the indicator. Alternatively, event control computing platform 110 may simply deny the requesting device the opportunity to proceed with the processing task.

If event control computing platform 110 authenticates the submitted job indicator, platform 110 may identify a first level of resources for executing the processing task in step 203. Platform 110 may identify the first level of resources by analyzing the complexity of the submitted processing task. These resources may include central processing unit cores or graphics processing units that can be accessed by data processing platform 120. In many applications, platform 110 may need to identify many processing units because the processing task authenticated by platform 110 may require extensive computational capabilities. Resources identified by platform 110 may be accessible via a network (e.g., private network 150 and/or public network 160).

Once event control computing platform 110 identifies a first level of resources for executing the processing task, platform 110 may then allocate the first level of resources for executing the processing task in step 204. Event control computing platform 110 may allocate these resources based on various factors, including availability of the resource, location of the resource, processing configurations associated with the resource, or any other factor. For example, platform 110 may determine that a first set of processing units would not perform a predetermined processing task in time for a project deadline associated with the processing task or may determine that a second set of processing units have no upcoming tasks on their task schedule. In this scenario, platform 110 may allocate all or a portion of the second set of processing units for performing the submitted task. Allocation of resources may prevent event control computing platform 110 from using the allocated resources for other tasks until the processing task for which the resources were allocated has been completed.

Figure 2B:
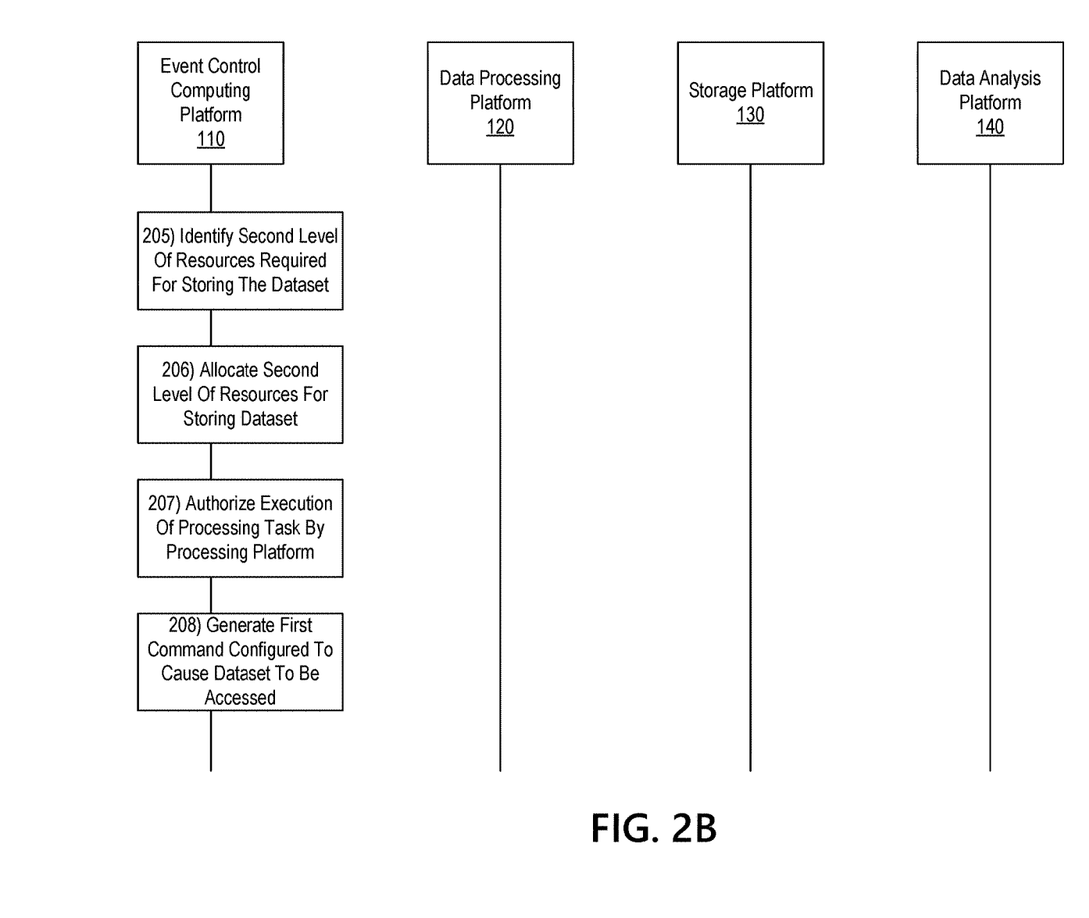

With reference to FIG. 2B, next, in step 205, event control computing platform 110 may identify a second level of resources required for storing a dataset to be processed in accordance with the processing task. Storage resources identified by platform 110 may also be accessible via a network (e.g., private network 150 and/or public network 160) and may include arrays or clusters of storage devices on storage platform 130. In one example, storage platform 130 may include many thousands of storage clusters for storing large quantities of data. Platform 110 may identify specific sectors or areas of storage platform 130 suitable for storing the dataset both before and after processing the dataset on data processing platform 120. In one example, the dataset to be processed may require a different amount of storage space on storage platform 130 before and after processing. In that case, platform 110 may identify the higher level of storage space required for the dataset and may allocate this higher level of storage space for the dataset (in the next step).

Once event control computing platform 110 has identified the level of resources required for storing the dataset, platform 110 may then allocate these resources for storing the dataset on storage platform 130 in step 206. Allocation of storage space on storage platform 130 may prevent event control computing platform 110 from using the allocated storage space for other datasets until the dataset for which the storage space was allocated is no longer needed. In one example, even though data processing platform 120 may include sufficient computational resources for any data processing application envisioned by an organization managing platform 120, platform 120 may not have any capacity to store the dataset.

In some aspects, storage platform 130 may be co-located with data processing platform 120. In other aspects, storage platform 130 may be located separately from data processing platform 120. Moreover, each of data processing platform 120 and storage platform 130 may include resources (e.g., processors, computer storage units) that are physically located in different locations. In addition, resource allocation on data processing platform 120 may be scaled up or down independently of resource allocation on storage platform 130.

In step 207, event control computing platform 110 may authorize execution of the processing task by processing platform 120. Platform 110 may authorize execution by, for example, allowing data processing platform 120 to access the ticket generated by platform 110. Data processing platform 110 may then begin to execute the processing task authenticated by the ticket in a local processing cluster. To allow data processing platform 120 to proceed with execution of the processing task, platform 110 may generate a first command configured to cause the associated dataset to be accessed from storage platform 130 in step 208.

Figure 2C:
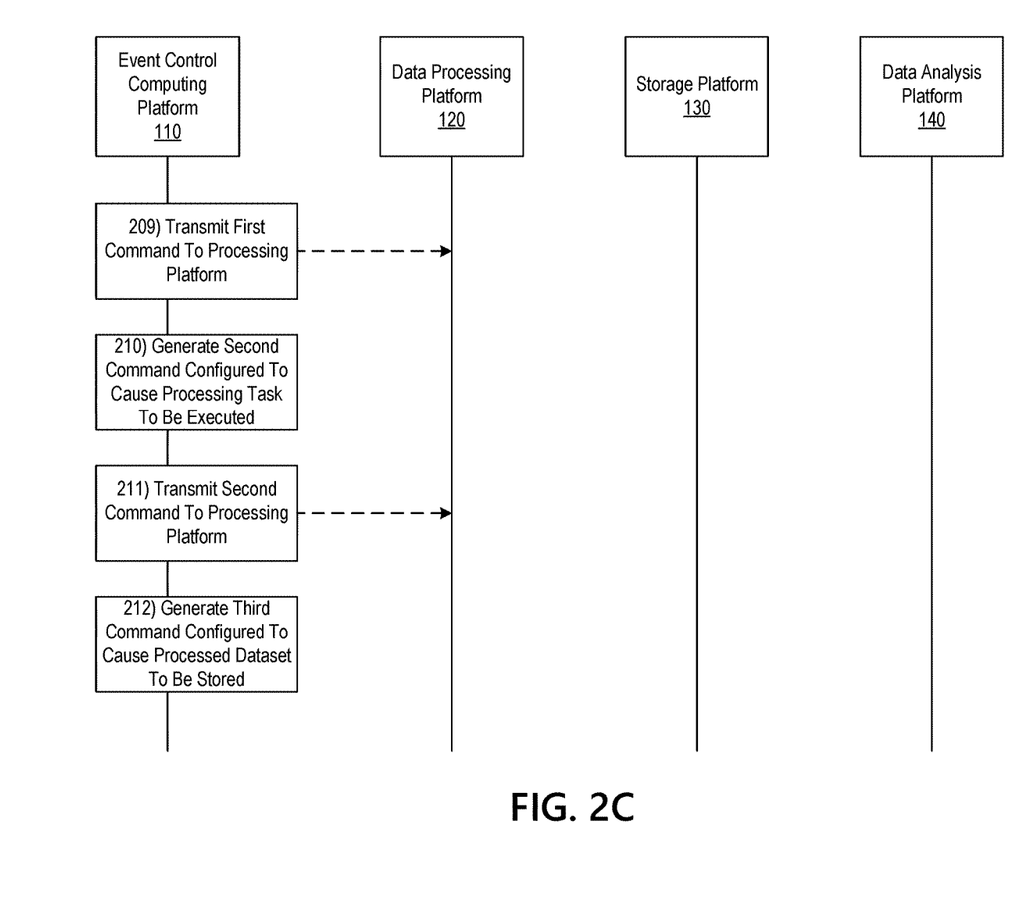

With reference to FIG. 2C, platform 110 may then transmit the first command to processing platform 120 in step 209 so that platform 110 can cause processing platform 120 to execute the first command. Processing platform 120 may then access the relevant dataset from storage platform 130. In accessing the relevant dataset, processing platform 120 may have to present authentication credentials (e.g., the ticket generated by platform 110) to storage platform 130 so that processing platform 120 may be directed to the appropriate storage unit on storage platform 130 for the stored dataset.

Then, in step 210, event control computing platform 110 may generate a second command configured to cause the processing task to be executed on the retrieved dataset and may transmit the second command to processing platform 120 in step 211 so that platform 110 can cause processing platform 120 to execute the second command. In one example, the processing task may relate to simulation of complex economic scenarios to help a financial institution (e.g., a bank) determine how much capital may be invested and how much should be set aside to meet thresholds set by regulatory agencies. In this example, the simulations may process various financial portfolios maintained by the bank, including, for example, payment device portfolios and loan portfolios. Inputs to such simulations (e.g., Monte Carlo simulations) may include the current economic conditions (e.g., economic growth, interest rates, unemployment rate) and the output may indicate the amount of capital that the financial institution should set aside versus invest. These types of simulations may be very process intensive and require high computational and memory resources.

Figure 2D:
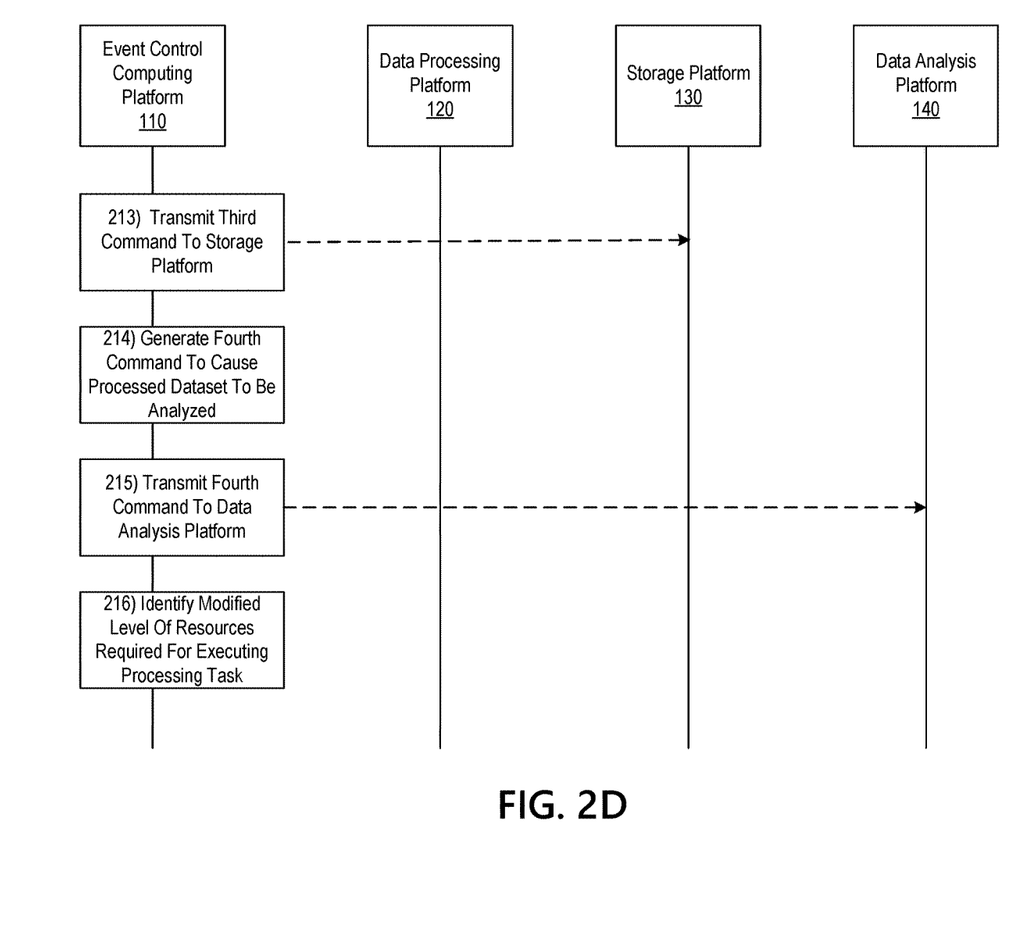

Platform 110 may then generate a third command configured to cause the processed dataset to be stored in step 212. With reference to FIG. 2D, platform 110 may transmit the third command to storage platform 130 in step 213 so that platform 110 can cause processing platform 120 to execute the third command. Processing platform 120 may then write the processed data back into appropriate storage clusters of storage platform 130. To write the processed data back to the appropriate location on storage platform 130, this storage operation may require processing platform 120 to present authentication credentials to storage platform 130. These authentication credentials may be a part of the ticket generated by event control computing platform 110 and transmitted to processing platform 120.

In step 214, event control computing platform 110 may generate a fourth command to cause the processed dataset to be analyzed by data analysis platform 140 and, in step 215, may transmit this fourth command to data analysis platform 140. Data analysis platform 140 may perform any type of data analysis on the relevant dataset. For example, the dataset can be filtered so that only relevant aspects are shown in a summary format. Alternatively, the dataset can be sampled so that particular features of the dataset are highlighted.

Figure 2E:
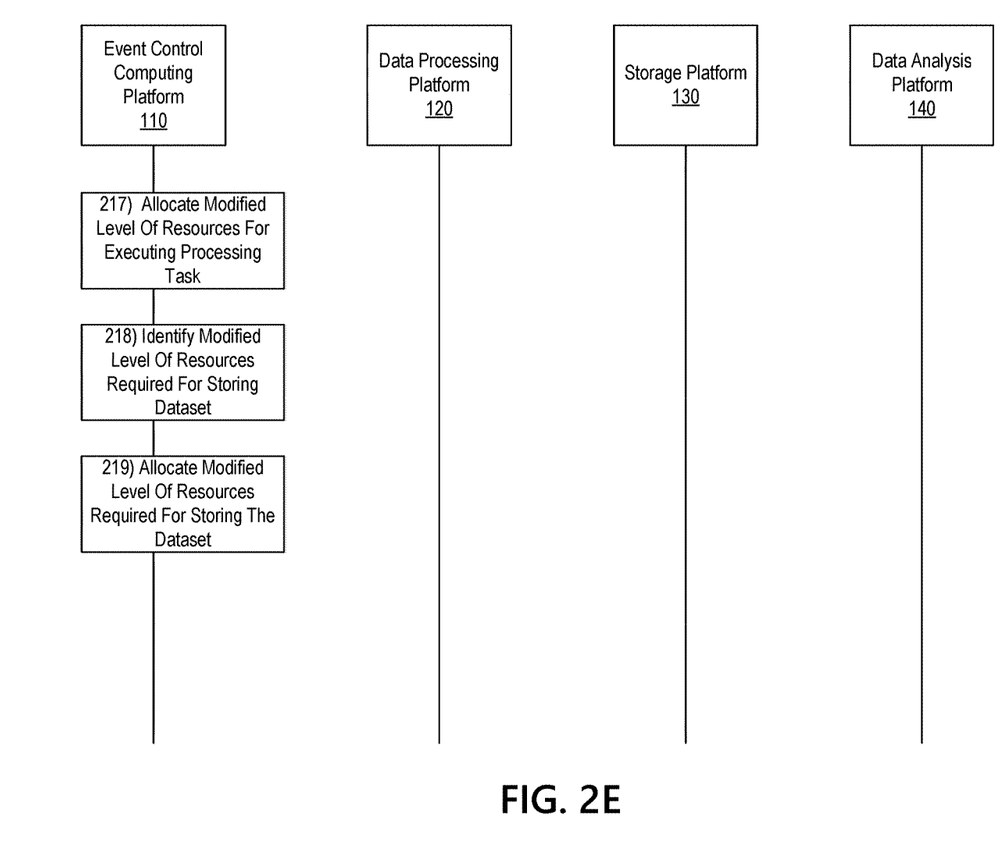

In step 216, platform 110 may identify a modified level of resources required for executing the processing task. With reference to FIG. 2E, event control computing platform 110 may allocate the modified level of resources for executing the processing task in step 217. Similarly, in step 218, event control computing platform 110 may identify a modified level of resources required for storing a dataset on storage platform 130 and may allocate the modified level of resources required for storing the dataset in step 219. These identifications and allocations may be in response to the start of a new processing task with a new dataset.

Figure 3:
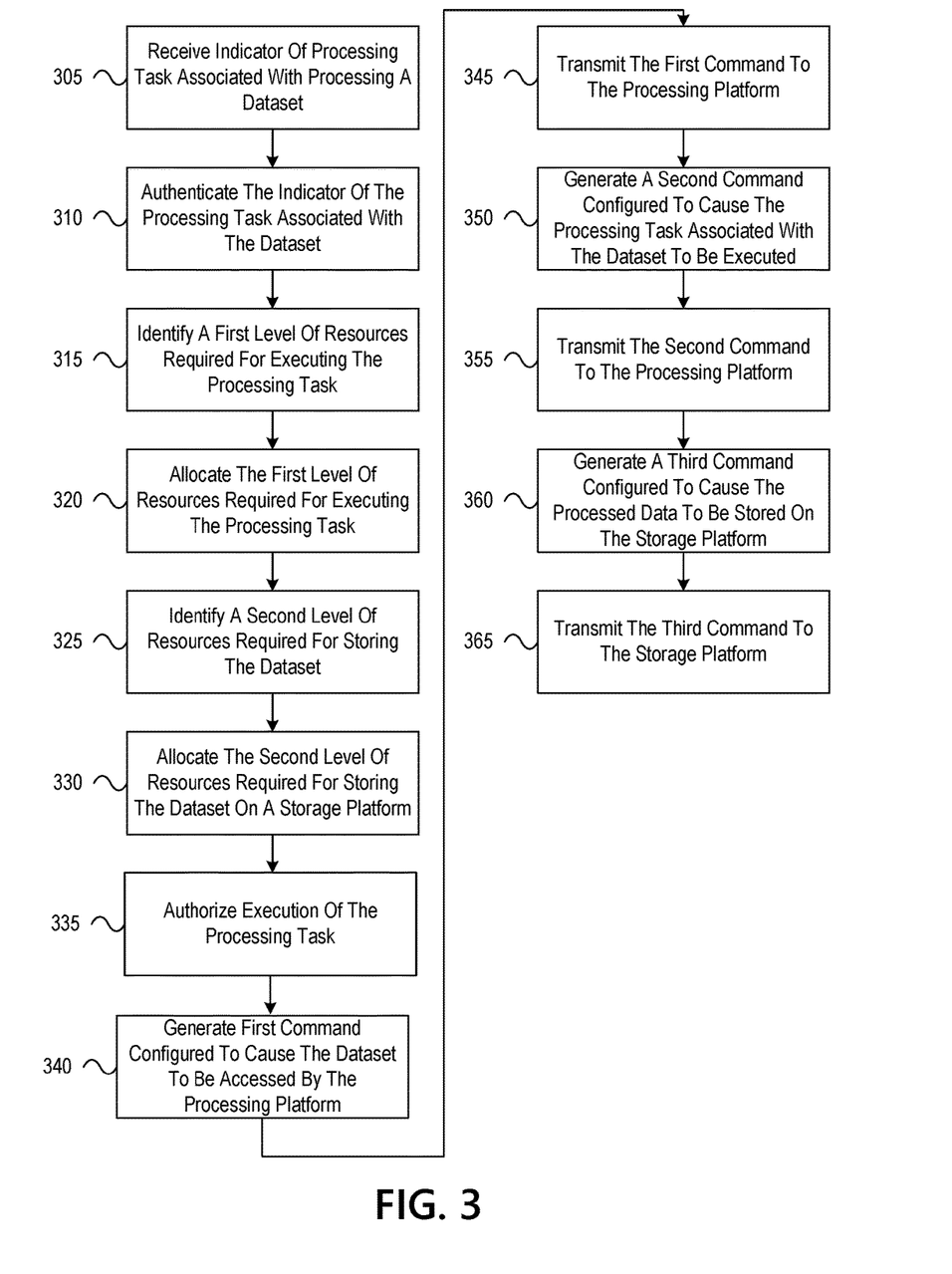
FIG. 3 depicts an illustrative method for independent storage and processing of data with centralized event control in accordance with one or more example embodiments.

FIG. 3 depicts an illustrative method for independent storage and processing of data with centralized event control in accordance with one or more example embodiments. Referring to FIG. 3, at step 305, a computing platform having at least one processor, a memory, and a communication interface may receive an indicator of a processing task associated with processing a dataset. At step 310, the computing platform may authenticate the indicator of the processing task associated with the dataset. At step 315, the computing platform may identify a first level of resources required for executing the processing task. At step 320, the computing platform may allocate the first level of resources required for executing the processing task on a processing platform. At step 325, the computing platform may identify a second level of resources required for storing the dataset and at step 330, the computing platform may allocate the second level of resources required for storing the dataset on a storage platform independent of the first level of resources allocated for executing the processing task. In step 335, the computing platform may authorize execution of the processing task by the processing platform. In step 340, the computing platform may generate a first command configured to cause the dataset to be accessed by the processing platform from the storage platform and may transmit, via the communication interface, the first command to the processing platform in step 345. In step 350, the computing platform may generate a second command configured to cause the processing task associated with the dataset to be executed and may transmit, via the communication interface, the second command to the processing platform in step 355. In step 360, the computing platform may generate a third command configured to cause the processed data to be stored on the storage platform and in step 365, the computing platform may transmit the third command to the storage platform. In one example, the steps of the method shown in FIG. 3 may be performed in the order shown. However, in general, the steps of the method shown in FIG. 3 may be performed in any order without departing from the scope of this disclosure.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface, an indicator of a processing task associated with processing a dataset;
   authenticate the indicator of the processing task associated with the dataset;
   identify a first level of resources required for executing the processing task;
   allocate the first level of resources required for executing the processing task on a processing platform;
   identify a second level of resources required for storing the dataset;
   allocate the second level of resources required for storing the dataset on a storage platform independent of the first level of resources allocated for executing the processing task;
   authorize execution of the processing task by the processing platform;
   generate a first command configured to cause the dataset to be accessed by the processing platform from the storage platform;
   transmit, via the communication interface, the first command to the processing platform;
   generate a second command configured to cause the processing task associated with the dataset to be executed;
   transmit, via the communication interface, the second command to the processing platform;
   generate a third command configured to cause the processed dataset to be stored on the storage platform; and
   transmit, via the communication interface, the third command to the storage platform identify a modified level of resources required for executing the processing task; and
   allocate the modified level of resources required for executing the processing task on the processing platform.

2. The computing platform of claim 1, wherein the memory stores additional computer-readable instructions that, when executed by the at least one processor, cause the computing platform to:
   generate a fourth command to cause the processed dataset to be analyzed by a data analysis platform.

3. The computing platform of claim 1, wherein the memory stores additional computer-readable instructions that, when executed by the at least one processor, cause the computing platform to:
   transmit, via the communication interface, the fourth command to the data analysis platform.

4. The computing platform of claim 1, wherein the processing platform includes a plurality of data processing clusters.

5. The computing platform of claim 1, wherein the storage platform includes encrypted storage zones.

6. The computing platform of claim 1, wherein the memory stores additional computer-readable instructions that, when executed by the at least one processor, cause the computing platform to:
   identify a modified level of resources required for storing the dataset.

7. The computing platform of claim 6, wherein the memory stores additional computer-readable instructions that, when executed by the at least one processor, cause the computing platform to:
   allocate the modified level of resources required for storing the dataset.

8. The computing platform of claim 1, wherein the storage platform comprises a distributed file system.

9. The computing platform of claim 1, wherein the processing platform is configured to perform Monte Carlo simulations on the dataset.

10. The computing platform of claim 1, wherein the storage platform and the processing platform use a same security layer.

11. A method, comprising:
at a computing platform comprising at least one processor, memory, and a communication interface:
receiving, via the communication interface, an indicator of a processing task associated with processing a dataset;
authenticating the indicator of the processing task associated with the dataset;
identifying a first level of resources required for executing the processing task;
allocating the first level of resources required for executing the processing task on a processing platform;
identifying a second level of resources required for storing the dataset;
allocating the second level of resources required for storing the dataset on a storage platform independent of the first level of resources allocated for executing the processing task;
authorizing execution of the processing task by the processing platform;
generating a first command configured to cause the dataset to be accessed by the processing platform from the storage platform;
transmitting, via the communication interface, the first command to the processing platform;
generating a second command configured to cause the processing task associated with the dataset to be executed;
transmitting, via the communication interface, the second command to the processing platform;
generating a third command configured to cause the processed dataset to be stored on the storage platform; and
transmitting, via the communication interface, the third command to the storage platform identity a modified level of resources required for executing the processing task; and
allocate the modified level of resources required for executing the processing task on the processing platform.

12. The method of claim 11, further comprising: generating a fourth command to cause the processed dataset to be analyzed by a data analysis platform.

13. The method of claim 11, wherein the storage platform comprises a distributed file system.

14. The method of claim 13, wherein the storage platform includes encrypted storage zones.

15. The method of claim 11, further comprising: identifying a modified level of resources required for executing the processing task.

16. The method of claim 11, further comprising: identifying a modified level of resources required for storing the dataset.

17. The method of claim 11, wherein the processing platform is configured to perform Monte Carlo simulations on the dataset.

18. One or more non-transitory computer-readable media storing instructions that, when executed by a computing platform comprising at least one processor, memory, and a communication interface, cause the computing platform to:
receive, via a communication interface, an indicator of a processing task associated with processing a dataset;
authenticate the indicator of the processing task associated with the dataset;
identify a first level of resources required for executing the processing task;
allocate the first level of resources required for executing the processing task on a processing platform;
identify a second level of resources required for storing the dataset;
allocate the second level of resources required for storing the dataset on a storage platform independent of the first level of resources allocated for executing the processing task;
authorize execution of the processing task by the processing platform;
generate a first command configured to cause the dataset to be accessed by the processing platform from the storage platform;
transmit, via the communication interface, the first command to the processing platform;
generate a second command configured to cause the processing task associated with the dataset to be executed;
transmit, via the communication interface, the second command to the processing platform;
generate a third command configured to cause the processed dataset to be stored on the storage platform; and
transmit, via the communication interface, the third command to the storage platform identify a modified level of resources required for executing the processing task; and
allocate the modified level of resources required for executing the processing task on the processing platform.

* * * * *

UNITED STATES PATENT AND TRADEMARK OFFICE
CERTIFICATE OF CORRECTION

PATENT NO. : 10,437,643 B2
APPLICATION NO. : 15/809683
DATED : October 8, 2019
INVENTOR(S) : Zott et al.

Page 1 of 1

It is certified that error appears in the above-identified patent and that said Letters Patent is hereby corrected as shown below:

In the Claims

Column 12, Line 33:
In Claim 1, after "storage platform", insert --;-- and --¶--

Column 13, Line 45:
In Claim 11, after "storage platform", insert --;-- and --¶--

Column 13, Line 45:
In Claim 11, delete "identity" and insert --identify--

Column 13, Line 51:
In Claim 12, after "comprising:", insert --¶--

Column 14, Line 5:
In Claim 15, after "comprising:", insert --¶--

Column 14, Line 8:
In Claim 16, after "comprising:", insert --¶--

Column 14, Line 46:
In Claim 18, after "storage platform", insert --;-- and --¶--

Signed and Sealed this
Fifteenth Day of December, 2020

Andrei Iancu
*Director of the United States Patent and Trademark Office*